United States Patent Office 3,331,846
Patented July 18, 1967

3,331,846
METAL CATALYST PROCESS FOR CONVERTING α-AMINO-ACETYLENES TO DIHYDROQUINOLINE
Nelson R. Easton, Indianapolis, and George F. Hennion, South Bend, Ind., assignors to Eli Lilly and Company, Indianapolis, Ind., a corporation of Indiana
No Drawing. Original application Aug. 28, 1963, Ser. No. 305,197. Divided and this application Feb. 18, 1966, Ser. No. 528,372
2 Claims. (Cl. 260—280)

The present application is a division of our pending application Ser. No. 305,197, filed Aug. 28, 1963 which was a continuation-in-part of our application Ser. No. 138,591, filed Sept. 18, 1961, now abandoned.

This invention relates to a novel method of synthesizing certain α-amino-acetylenes by means of heavy metal catalysts. This invention also relates to a method for the synthesis of novel α-anilino-acetylenes and to a novel method for the synthesis of dihydroquinolines.

It is well known in the art that secondary halides, characterized by the partial structure:

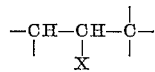

where X=halogen and the remaining bonds are attached to hydrogen or a hydrocarbon group, alkylate amines only with difficulty and in low yield. It is also well known that tertiary halides, characterized by the partial structure:

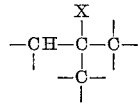

are useless for the purpose of alkylating amines. The failure of what should be a standard alkylation procedure occurs because amines, as well as ammonia, ordinarily react with secondary halides, and invariably with tertiary halides, to split out the elements of a hydrogen halide from the secondary or the tertiary organic halide used, to form an unsaturated hydrocarbon rather than the desired alkylated amine.

Recently, it has been found that secondary and tertiary propargyl halides of the partial structures:

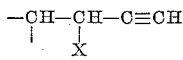

and

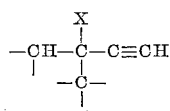

respectively, X being a halogen atom, react with primary amines, R—NH$_2$, and with secondary amines, RR'NH, to produce secondary and tertiary amines respectively. In this reaction, quite surprisingly, the elements of a hydrogen halide, HX, are not split out of the alkyl halide. Thus, many sterically crowded secondary and tertiary acetylenic amines which were previously unknown could be prepared in adequate yield.

This latter procedure, however, still did not operate as well as might be desired when the substrate, i.e., the primary or the secondary amine being alkylated, was itself a weak base, such as aniline or other aromatic amines, or was itself a sterically hindered amine such as t-butylamine or the like. In such cases the alkylation reaction yielding the desired α-amino-acetylene was exceedingly slow, taking as long as thirty days or more for the formation of the desired product in satisfactory amount.

It is an object of this invention to provide a rapid method for the preparation of acetylenic amines by the reaction of an acetylenic halide with a primary or secondary amine. It is a further object of this invention to provide a method for preparing α-anilino-acetylenes by the direct reaction of an acetylenic halide with an aniline or substituted aniline. It is a still further object of this invention to provide a new method of synthesizing dihydroquinolines. Other objects of this invention will become apparent from the description which follows.

In fulfillment of the above and other objects, this invention provides a process for the preparation of acetylenic amines comprising the reaction of an α-acetylenic halide such as an acetylenic chloride or bromide with a primary or secondary amine in the presence of a catalytic quantity of a heavy metal. This reaction can be graphically represented by Equation I below:

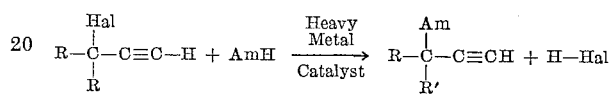

Equation I wherein

R, when taken separately, represents $C_1$–$C_{12}$ alkyl, $C_2$–$C_{12}$ alkenyl, cycloalkyl, cycloalkenyl, or lower alkoxy-substituted $C_1$–$C_5$ alkyl;

R', when taken separately, represents hydrogen, $C_1$–$C_{12}$ alkyl, $C_2$–$C_{12}$ alkenyl, cycloalkyl, cycloalkenyl, or lower alkoxy-substituted $C_1$–$C_5$ alkyl;

R and R', when taken together with the carbon atom to which they are attached, represent cycloalkyl or cycloalkenyl;

Hal represents a halogen atom such as chlorine and bromine; and,

Am represents

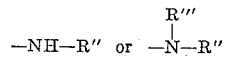

wherein R'' and R''', when taken separately, represent the same or different members of the group consisting of $C_1$–$C_{12}$ alkyl, $C_3$–$C_{12}$ alkenyl, cycloalkyl, cycloalkenyl, monocyclic aryl, bicyclic aryl, monocyclic and bicyclic aryl-substituted $C_1$–$C_5$ alkyl, mercapto-substituted $C_1$–$C_5$ alkyl, hydroxy-substituted $C_1$–$C_5$ alkyl, lower alkoxy-substituted $C_1$–$C_5$ alkyl, amino-substituted $C_1$–$C_5$ alkyl, lower alkylamino-substituted $C_1$–$C_5$ alkyl, and di-lower alkylamino substituted $C_1$–$C_5$ alkyl; and when taken together with the nitrogen atom to which they are attached, the atoms necessary to complete a piperidine, pyrrolidine, piperazine, morpholine or thiomorpholine ring.

The reaction represented by Equation I is of particular value in those instances where R' represents a group other than hydrogen, the acetylenic halide thus becoming a highly hindered tertiary acetylenic halide, inasmuch as the prior-art method of preparing such compounds proceeds extremely slowly with the reaction rate depending largely upon the degree of steric hindrance present in the reactants.

In the above formulas, when R, R', R'', and R''' are alkyl radicals having 1–12 carbon atoms, they can be illustratively methyl, ethyl, isopropyl, n-butyl, n-amyl, 3-methylpentyl, 2-ethylhexyl, n-decyl, 6-ethyldecyl, neopentyl and the like. When R, R', R'', and R''' represent alkenyl radicals having from 2–12 carbon atoms, or 3–12 carbon atoms, they can be illustratively vinyl, allyl, methallyl, 3-butenyl, 2-pentenyl, 1-methyl, 3-hexenyl, undecenyl, iso-octenyl and the like. When R'' or R''' represent a monocyclic or bicyclic aryl radical they can be illustratively phenyl, thienyl, furyl, pyridyl, pyrimidyl, naphthyl, quinolinyl, as well as other radicals which fulfill the usual criteria for aromaticity. By the term "aryl" is also meant any of the above aromatic radicals which are substituted by groups which do not interfere with the various synthetic procedures useful in preparing the compounds or in utilizing them in further reactions. Among the permissible substituents in these aromatic rings are halogen, $C_1$–$C_5$ alkyl, $C_2$–$C_5$ alkenyl, nitro, perhalo-lower alkyl, hydroxy, mercapto, amino, lower alkoxy, lower alkylamino, di-lower alkylamine and the like. The term "lower alkyl" in the above group of substituents signifies a radical having from 1–3 carbon atoms such as methyl, ethyl, or n-propyl. Illustrative aromatic or substituted aromatic radicals which R″ and R‴ can represent thus include α-naphthyl, p-tolyl, 2-chlorophenyl, lepidyl, 2-hydroxyfuryl, quinaldinyl, 2-dimethylaminopyridyl, o-, m-, p-bromophenyl, tolyl, allylphenyl, styryl, trifluoromethylphenyl, pentafluoroethylphenyl, trichloromethylphenyl, p-(n-hexyl)phenyl, 2-hydroxyphenyl, o-aminophenyl, o-ethylaminophenyl, 2-mercaptophenyl, 5-ethyl-3-aminopyridyl, 2-nitrothienyl, 3-methylfuryl, anisyl, etc.

To further illustrate permissible groupings in the reactants of Equation I, R, R′, R″ and R‴, when taken singly, can represent cycloalkyl radicals or cycloalkenyl radicals such as cyclobutyl, cyclopentyl, cyclohexyl, cycloheptyl, cyclo-octyl, methylcyclopentyl, cyclopentenyl, cyclohexenyl and the like; R and R′, when taken together with the carbon atom to which they are attached, can represent a cyclic radical, as for example tetralinyl, indanyl, cyclohexyl, fluorenyl, cyclopentenyl, cyclobutyl, dihydroanthranyl, xanthyl, thioxanthyl, dibenzocycloheptadienyl or dibenzocycloheptatrienyl, cycloheptyl and the like. When R, R′, R″ and R‴ represent lower alkoxy-substituted $C_1$–$C_5$ alkyl radicals, they can be illustratively methoxyisopropyl, ethoxypropyl, ethoxyethyl, isopropoxyamyl and the like. When R″ and R‴ represent an aryl-substituted $C_1$–$C_5$ alkyl radical, they can be illustratively benzyl, phenethyl, 5-phenylpentyl, 2-phenylpropyl, 4-phenylbutyl, 1-phenylethyl, 1-tolylethyl, m-chlorobenzyl and the like, the permissible aryl radicals substituted in the alkyl chain being, in general, those defined above for R, R′, R″ when they represent aryl. When R″ or R‴ represent a $C_1$–$C_5$ alkyl group substituted with a hydroxy group, a mercapto group, a lower alkoxy group such as methoxy, ethoxy, n-propoxy or isopropoxy, an amino group, a lower alkylamino such as methylamino, ethylamino, n-propylamino, isopropylamino, or a di-lower alkylamino group such as dimethylamino, diethylamino, di - n - propylamino, methylethylamino, ethylisopropylamino and the like, they can be 2-hydroxyethyl, 2-mercaptopropyl, 2-hydroxypropyl, 2-aminoethyl, 1-methyl-aminoethyl, 1-methyl-1-aminoethyl, 2-ethylaminoethyl, 2-di - n - propylaminoethyl, 2-n-propoxyethyl, 5-dimethylaminopentyl, 4-isopropylamino, 1-methylbutyl, 2-diethyl-amino-1,1-dimethylethyl, 2-isopropoxymethylpropyl and the like.

Included also within the definition of AmH are aliphatic amines which have multiple substituents of the type specified above such as β-(4-chloro)phenyl-β-aminoethylamine, β - naphthyl-β-hydroxypropylamine, 3-diethylamino-2-hydroxyethylamine, 2,3-dimercaptopropylamine and the like.

R″ and R‴, when taken together with the amine nitrogen to which they are attached, can also represent certain groupings of atoms such as tetramethylene or pentamethylene chain, or a tetramethylene chain interrupted by an oxygen or sulfur or nitrogen atom. These chains can also contain one or more substituents such as lower alkyl groups.

Illustrative amines represented by AmH in the above equation thus include methylamine, ethylamine, diallylamine, propylamine, N-methylallylamine, 4-methylpiperazine, t-butylamine, methallylamine, isopropylamine, n-butylamine sec.-butylamine, t-amylamine, isoamylamine, di-ethylamine, dimethylamine, N-methyl t-butylamine, N-ethyl isopropylamine, benzylamine, dibenzylamine, chlorobenzylamine, methoxybenzylamine, ethoxybenzylamine, aniline, toluidine, anisidine, N,2 - dimethyl - 4 - chloraniline, 3,4-dimethoxyaniline, 2,4,5-trichloraniline, N-methyl aniline, thiomorpholine, N-ethyl aniline, α-picoline, γ-picoline, lepidine, 3-methylmorpholine, 2,3-dimethylpyrrolidine, cyclopentylamine, cyclopropylamine, cyclobutylamine, cyclohexylamine, cycloheptylamine, dicyclohexylamine, N-methyl cyclopentylamine, N-n-propylcyclohexylamine, N-n-butyl cyclopropylamine, bicyclo[2.2.2]octylamine, bicyclo[4.4.0]decylamine, N-methyl bicyclo[3.1.1]heptylamine, N-n-butyl bicyclo[3.1.0]hexylamine, o-aminoaniline, o-mercaptoaniline, 2-n-propylaminoaniline, methylmercaptoaniline, p-ethoxyaniline and the like.

In carrying out the reaction represented by Equation I above, an amine, AmH, is reacted with an α-acetylenic halide (I) in an inert dispersing medium such as an aqueous or organic solution, suspension or emulsion and in the presence of a heavy metal catalyst, to yield an α-aminoacetylene (II). The reaction is ordinarily carried out at atmospheric pressure, and the preferred reaction temperature lies in the range from about 10° C. to about 100° C., although temperatures above and below this range are fully operative. The time of the reaction varies from about 1 hour to about 72 hours, or even longer, depending upon the temperature of the reaction and upon the reactivities of the amine and of the hindered acetylenic halide. The heavy metal catalyst is desirably present in an amount varying from about 100 mg. to about 5 to 10 percent by weight of the acetylenic halide, although lesser quantities than 100 mg. still manifest a catalytic action.

The heavy metal catalyst can be present either in the form of a salt such as a chloride, sulfate, nitrate, acetate or the like, or in the form of the metal, preferably in finely divided state, or as a combination of salt and free metal. Among the heavy metals useful as catalysts are those of the second main group of the Periodic Table such as calcium of the third main group such as aluminum, of the fourth main group such as tin and lead, of the fifth main group such as bismuth, and all the metals of the sub-groups and of the transition series including lanthanum, zirconium, niobium, chromium, uranium, manganese, silver, gold, mercury, iron, cobalt and nickel. Of particular value are the metals of the copper sub-group, which also includes silver and gold. These metals exhibit their catalytic effect both singly and in combination.

Among the heavy metals which catalyze our novel reaction, copper is particularly useful either in the form of a salt, as for example cuprous chloride, cuprous sulfate, cuprous nitrate and the like, or as metallic copper, particularly in the form of copper powder or copper-bronze powder. A combination of copper-bronze powder and cuprous chloride seems to exert a catalytic effect beyond that provided by these substances individually.

In general, when an aqueous dispersing system is employed, a metallic catalyst such as copper powder or aluminum powder dissolves during the course of the reaction because of the presence of halide ions derived from the acetylenic halide reactant present in solution, and thus, cannot be recovered in its original form as in the case with usual catalysts.

The following chart is provided to demonstrate the effect of a heavy metal catalyst, specifically copper-bronze powder, upon the rate of reaction between a hindered acetylenic chloride, in this case 3-chloro-3-ethyl-1-pentyne, and a series of primary amines; i.e., ethylamine, isopropylamine, and t-butylamine according to the novel process provided by this invention. Duplicate reaction mixtures containing the tertiary acetylenic halide and the particular primary amines were prepared and the reactions were treated in identical fashion except that 200 mg. of copper-bronze powder were added to one of each pair of the otherwise identical reaction mixtures. The ingredients were mixed at ambient room temperatures in each instance. The three reaction mixtures containing copper-bronze powder catalyst, however, spontaneously warmed up to a temperature in the range 50–65° C. shortly after mixing. The six reaction mixtures were also worked up in identical fashion. The single exception to the identical treatment accorded the six reactions was the heating of the uncatalyzed reaction between isopropylamine and 3-chloro-3-ethyl-1-pentyne to about 40° C. on the seventh reaction day.

In Chart I, column 1 gives the name of the amine which was used to react with 3-chloro-3-ethyl-1-pentyne, column 2 gives the amount, if any, of catalyst (specifically, copper-bronze powder) added, column 3 the percent yield of the desired acetylenic amine, and column 4 the length of time necessary to achieve the given yield.

CHART I

| Amine used to react with 3-chloro-3-ethyl-1-pentyne | Amount Copper-Bronze Powder Present, mg. | Yield, Percent | Reaction Time |
|---|---|---|---|
| Ethylamine | None | 23.4 | 15 days. |
|  | 200 | 27.1 | 2 hr. |
| Isopropylamine | None | 38.4 | 13 days. |
|  | 200 | 23.0 | 2 hr. |
| t-Butylamine | None | 31.3 | 7 days. |
|  | 200 | 24.8 | 2 hr. |

The above chart illustrates the profound catalytic effect which a heavy metal such as copper exerts upon the rate of the reaction between primary and secondary amines and hindered acetylenic halides.

As further examples of the effect of heavy metals upon the reaction of a hindered acetylenic halide and primary amine, it was found that both ferric chloride and mercuric chloride in catalytic amounts cause the reaction between t-butylamine and 3-chloro-3-methyl-1-butyne to proceed to about 60 percent of completion upon heating for about 16 hours. Silver chloride under the same conditions afforded a 30 percent yield of the desired product.

In carrying out the reaction of an α-halo-acetylene and an arylamine in the presence of an inert solvent and a heavy metal catalyst, it was found, surprisingly, that certain of the open chain α-arylamino-acetylenes formed initially in the reaction condensed under the given reaction conditions to yield a dihydroquinoline. This reaction can be visualized schematically according to Equation II below, using propargylaniline for illustrative purposes only.

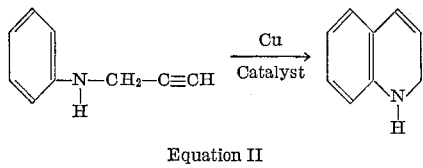

Equation II

The reaction can be generalized according to Equation III below:

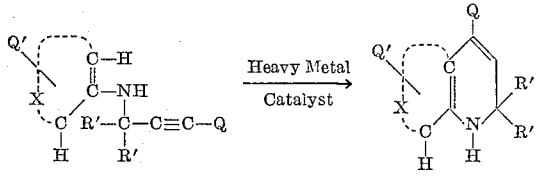

Equation III wherein R', when taken singly, has the same meaning as hereinabove; and, the two R' groups, when taken together with the carbon atom to which they are attached, represent cycloalkyl or cycloalkenyl. The two R''s can represent the same or different groups in a given molecule.

In the above equation, Q represents a member of the group consisting of hydrogen, $C_1$–$C_5$ alkyl, lower-alkoxy-substituted $C_1$–$C_5$ alkyl, and monocyclic aryl-substituted $C_1$–$C_5$ alkyl. Illustrative groups which Q represents include methyl, ethyl, n-propyl, isopropyl, isobutyl, sec.- butyl, sec.-amyl, t-amyl, n-amyl, isoamyl and the like, as well as any of the above radicals substituted with a methoxy, ethoxy, isopropoxy, n-propoxy, phenyl, p-chlorophenyl, p-methoxyphenyl, α-picolyl-6, 4-pyridyl, 3-pyrimidyl, thienyl or the like group. The substituted or unsubstituted monocyclic and bicyclic aromatic ring systems which are present in certain of the groupings represented by Q can be any of those listed above for R'' and R'''.

In addition, X in the above equation represents a grouping of atoms necessary to complete a monocyclic or bicyclic aromatic ring; and Q' represents a member of the group consisting of halogen (such as fluorine, chlorine, bromine or iodine); $C_1$–$C_5$ alkyl (such as methyl, ethyl, propyl, isobutyl or n-amyl); $C_2$–$C_5$ alkenyl (such as allyl, crotyl, methallyl and pentenyl); nitro; perhalo-lower alkyl (such as trifluoromethyl, trichloromethyl, pentafluoroethyl and the like); lower alkoxy; di-lower alkylamino and the like. In the above groupings, as before, the term "lower alkyl" represents a carbon chain having from 1–3 carbon atoms.

It will be noted from the above schematic representation that the condensation of the acetylenic grouping on the aromatic nucleus takes place on a carbon atom ortho to the aniline nitrogen; thus, only those aryl groups which have an unsubstituted ortho position can undergo further condensation to yield a dihydroquinoline as represented by Equation III above.

The dihydroquinolines produced by this reaction in which both R''s are hydrogen are readily oxidizable in air, and it is possible to isolate the dihydroquinoline itself under these conditions only by excluding oxygen. Even with such precautions, the dihydroquinolines sometimes disproportionate to yield a mixture of the quinoline and the tetrahydroquinoline, since both of these ring systems are thermodynamically more stable than is the dihydroquinoline ring system. If one R' is other than hydrogen, the resulting substituted dihydroquinoline is relatively stable to oxidation and can be isolated when special precautions are taken. When both R''s are other than hydrogen, the resulting dihydroquinoline is, of course, stable to oxidation.

The reaction represented by Equation III above, whose product is a dihydroquinoline, apparently takes place more slowly than the reaction represented by Equation I above, since it is possible to isolate some of the α-arylamino-acetylene intermediate when AmH in Equation I represents an arylamine.

As would be expected, the longer the reaction is allowed to proceed the higher the yield of dihydroquinoline cyclization product. However, as in the case of other successive reactions, the maximum yield of uncyclized α-arylaminoacetylene can be obtained at different reaction times depending upon the rate constants for the reaction represented by Equation I and for the reaction represented by Equation III. In addition, it is possible to minimize the yield of either cyclized or uncyclized product by judicious selection of the heavy metal catalyst. For example, the use of copper catalyst in our hands gives the best yields of dihydroquinoline reaction product relative to α-arylamino-acetylene reaction product for any given reaction time. The exact contrary is true of a silver catalyst, the use of which gives only minor yields of dihydroquinoline even after greatly prolonged reaction times. The other heavy metal catalysts which are useful in the process of Example I give relative amounts of open chain acetylene and dihydroquinoline somewhere between the two extremes represented by the copper- and silver-catalyzed reactions.

In carrying out the reaction represented by Equation III, an α-arylamino-acetylene, which lacks ortho substituents in the aryl ring, is dispersed in an inert solvent, preferably aqueous ethanol, and the heavy metal catalyst is added to this dispersion. The subsequent reaction mixture is stirred at ambient room temperature or above for periods of time varying from several hours to several days. The compound is isolated by removing the catalyst by filtration and the solvents by evaporation in vacuo, leaving a dihydroquinoline, dihydronaphthyridine or the like as a residue. The heterocyclic base thus synthesized is purified by conversion to the corresponding hydrochloride salt, extraction of the aqueous solution of this salt with ether, reconversion to the free base, extraction of the alkali-insoluble free base into ether, and fractional distillation of the ether solution.

An alternate procedure involves the use of a two-phase system; for example, the use of both water and ether as diluents for the α-arylamino-acetylene as well as for the heavy metal catalyst combination of copper-bronze powder and cuprous chloride.

Although the reaction represented by Equation III is most conveniently carried out by simply stirring the reaction mixture at temperatures in the range from 25–30° C. for a period varying from 0.5 to 3 days, somewhat higher temperatures and shorter reaction times give equally satisfactory results. However, if temperatures above 50° C. are employed, both the reactants and reaction products undergo various undesirable side reactions so that the total yield of desired product is noticeably reduced. The starting materials for the reaction represented by Equation III above, in which either R′ or Q is hydrogen, are produced by the process outlined by Equation I above or by other known processes.

It is, of course, possible to prepare dihydroquinolines directed by the process of Equation I without bothering to isolate the intermediate α-anilino-acetylene. This reaction can be better visualized by reference to Equation IV which follows.

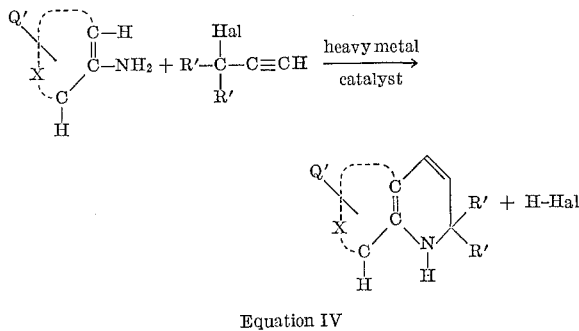

Equation IV wherein R′, Q′, X and Hal have the same meaning as hereinabove.

The reaction conditions for Equation IV are the same as those for Equation I above except that time, temperature, and the nature of the catalyst are so manipulated as to maximize the yield of dihydroquinoline.

The compounds produced by Equation I above are useful in the same way in which α-amino-acetylenes have been employed in the past, i.e., as corrosion inhibitors, as hypotensive agents, as pesticides and as chemical intermediates. The use of certain of the α-amino-acetylene products capable of being synthesized by Equation I as intermediates is well illustrated in the co-pending application of Easton and Hennion, Ser. No. 305,205, filed Aug. 28, 1963, wherein these compounds are employed in the production of heterocyclic ring compounds. The α-arylamino-acetylenes produced in accordance with Equation I above are, of course, useful as chemical intermediates as illustrated in Equations II and III. Furthermore, compounds preparable by the procedure of Equation I, wherein Am is R″NH—, can be reacted with ethylene oxide, a thiirane or an azirane to yield a reactive intermediate which is capable of being cyclized to yield a substituted morpholine, thiomorpholine or piperazine, as set forth in the co-pending application of Easton and Dillard, Ser. No. 213,581, filed July 31, 1962, now U.S. Patent 3,225,042. Other similar uses for compounds preparable by the method of Equation I as intermediates are set forth in the above-mentioned co-pending application of Easton and Hennion.

In addition to reactions which can be carried out on the amino function of the α-amino-acetylenes preparable by the procedure of Equation I, it is apparent that the acetylenic bond present in these compounds can be hydrogenated to yield the corresponding ethylene or ethane derivatives or can be hydrated to yield the corresponding α-hydroxyethyl or acetyl derivative. Many of these latter compounds, as well as the acetylenic starting materials from which they are derived, are useful pharmacologically, for example, as hypotensive agents. In addition, the compound N-ethyl-N-2-(4-methyl-3-chloroanilino)ethyl-3-amino-3-methyl-1-butyne, as well as compounds related to it, has shown schistosomicidal activity.

The dihydroquinolines which can be prepared by the method of Equation III or Equation IV are also useful as intermediates, in particular those which can be readily oxidized to the corresponding quinoline. Utilities of various quinolines are too well known to require enumeration. Among the dihydroquinolines themselves, those in which Q′ in Equation III or Equation IV is alkoxy are excellent antioxidants. It should be emphasized, however, that the dihydroquinolines preparable according to Equation III or Equation IV above represent such a wide variety of hitherto unobtainable chemical structures that it is not necessary to spell out in detail all conceivable utilities for these compounds, since those skilled in the art to which quinoline and its relatives pertain will readily discern many utilities for this new class of compounds.

This invention is further illustrated by the following specific examples:

*Example 1.—3-o-aminoanilino-3-methyl-1-butyne*

Twenty-seven grams of o-phenylenediamine, 0.5 g. of copper-bronze powder, and 0.5 g. of cuprous chloride were added to 1000 ml. of ether. Twenty-five grams of 3-chloro-3-methyl-1-butyne were added dropwise to this mixture followed by 50.5 g. of triethylamine. After the addition had been completed, the reaction was stirred for about three hours. At the end of this time, 1000 ml. of water were added. The organic layer was separated, was washed twice with 500-ml. portions of water, and was dried. The ether was removed by evaporation in vacuo, and the residue, comprising 3-o-aminoanilino-3-methyl-1-butyne plus some unreacted starting material and some triethylamine, was purified by fractional distillation. 3-o-aminoanilino-3-methyl-1-butyne distilled in the range 84–85° C. /0.04 mm. Hg. An infrared spectrum of the material indicated that it had the postulated structure.

*Analysis.*—Calc.: C, 75.82; H, 8.10. Found: C, 75.57; H, 7.92.

*Example 2.—N-methyl-N-(2′-hydroxyethyl)-3-amino-3-methyl-1-butyne*

One hundred and one grams of 3-chloro-3-methyl-1-butyne were added dropwise with stirring to a mixture comprising 260 g. of N-(2′-hydroxyethyl)methylamine, 1 g. of cuprous chloride, and 1 g. of copper-bronze powder in 300 ml. of dimethylformamide. After the chloro compound had been added, the reaction mixture was stirred at ambient room temperature for about 5 hours. 500 ml. of water and 50 ml. of 50 percent sodium hydroxide were added and the resulting mixture was extracted with ether. The ether solution containing N-methyl-N-(2′-hydroxyethyl)-3 - amino-3-methyl - 1 - butyne was separated, was washed once with 250 ml. of water, and was dried. The ether was removed by evaporation in vacuo and the compound was distilled. N-methyl-N-(2′-hydroxyethyl)-3 - amino-3-methyl-1-butyne boiled in the range 62–76° C./7 mm. Hg; $n_D^{25}$=1.469.

N-methyl-N-(2'-hydroxyethyl)-3-amino-3-methyl-1-butyne hydrochloride was prepared by dissolving the free base in ether and saturating the ether solution with anhydrous gaseous hydrogen chloride. N-methyl-N-(2'-hydroxyethyl)-3-amino-3-methyl-1-butyne hydrochloride was insoluble in ether and was separated by filtration. The compound melted at about 88–90° C. after recrystallization from ethyl acetate.

*Analysis.*—Calc.: N, 7.88; Cl, 19.96. Found: N, 7.56; Cl, 20.18.

*Example 3.—3-(2'-aminoethylamino)-3-methyl-1-butyne*

Two hundred and twelve grams of 85 percent aqueous ethylenediamine, 1 g. of copper-bronze powder, and 1 g. of cuprous chloride were added to 250 ml. of water, 101 g. of 3-chloro-3-methyl-1-butyne were added to the cooled stirred reaction mixture in dropwise fashion. After the addition had been completed, the reaction mixture was stirred at ambient room temperature for about 48 hours. 3-(2'-aminoethylamino)-3-methyl-1-butyne thus formed was isolated by the procedure of Example 2 and was purified by distillation. The compound boiled in the range 51–52° C./7 mm. Hg; $n_D^{25}$=1.561.

3-(2'-aminoethylamino)-3-methyl-1-butyne hydrochloride was prepared according to the procedure of Example 2 and melted at about 180–182° C. after recrystallization from a mixture of isopropanol and ethanol.

*Example 4.—3-p-chloranilino-3-methyl-1-butyne*

A reaction mixture was prepared from 127.5 g. of p-chloraniline, 0.5 g. of cuprous chloride, 0.5 g. of copper-bronze powder, 101 g. of triethylamine, and 40 ml. of ether. 103 g. of 3-chloro-3-methyl-1-butyne were added dropwise to the stirred reaction mixture. After the addition had been completed, the reaction mixture was stirred for an additional 2 hours, and 3-p-chloranilino-3-methyl-1-butyne formed in the above reaction was isolated by the procedure of Example 1. The compound boiled at about 98–99° C. at a pressure of 0.4 mm. of mercury; $n_D^{25}$=1.554. The yield was 46 percent of theory.

*Example 5.—N-(m-nitrophenyl)-3-amino-3-methyl-1-butyne*

Following the procedure of Example 3, m-nitroaniline was reacted with 3-chloro-3-methyl-1-butyne in the presence of copper-bronze powder and triethylamine to yield N-(m-nitrophenyl)-3-amino-3-methyl-1-butyne which was isolated and purified by the procedure of Example 2. N-(m-nitrophenyl)-3-amino-3-methyl-1-butyne distilled at about 130° C. at a pressure of about 0.5 mm. of Hg.

*Analysis.*—Calc.: C, 64.69; H, 5.92; N, 13.72. Found: C, 64.60; H, 5.69; N, 13.52.

Following the same procedure, N-methyl propargylaniline was prepared by reacting N-methylaniline with propargyl bromide. The compound boiled at about 83° C. at a pressure of 2.0 mm. Hg.

Following the same procedure, aniline was reacted with propargyl bromide to yield propargylaniline boiling at about 80° C./5 mm. Hg.

*Analysis.*—Calc.: N, 10.68. Found: N, 10.50.

Following the same procedure, phenetidine and 3-chloro-3-methyl-1-butyne were reacted in the presence of silver chloride to yield 3-p-ethoxyanilino-3-methyl-1-butyne which boiled at about 140–146° C./5 mm. Hg. The corresponding hydrochloride salt was prepared by the method of Example 2 and melted at about 163° C. after recrystallization from ethyl acetate.

*Analysis.*—Calc.: C, 53.14; H, 7.57; N, 5.84. Found: C, 65.42; H, 7.70; N, 5.76.

Following the same procedure, 4-aminopyridine was reacted with 3-chloro-3-methyl-1-butyne to yield N-(4-pyridyl) 3-amino-3-methyl-1-butyne. The compound was a solid and was purified by chromatography over Grade III (Woelm) activated alumina, using a 20 percent chloroform, 80 percent benzene solution as the eluent. Evaporation of the eluting solution yielded purified N-(4-pyridyl) 3-amino-3-methyl-1-butyne melting at about 17–18° C.

*Example 6.—N-methyl propargylaniline*

A reaction mixture was prepared containing 150 g. of N-methylaniline, 500 ml. of triethylamine, and 5 g. of silver chloride. The reaction mixture was heated to refluxing temperature and 70 g. of 3-chloro-1-propyne were added in dropwise fashion with stirring over a period of about 2 hours. After the addition had been completed, the reaction mixture was cooled to ambient room temperature and then stirred at that temperature for 15 hours. Two hundred grams each of water and ether were added and the ether layer was separated. The ether layer was extracted with 12 N aqueous hydrochloric acid. The acidic aqueous solution was washed with ether and the ether washes were discarded. The acidic layer was then made basic by the addition of 45 percent aqueous sodium hydroxide, thus causing N-methyl propargylaniline, which was insoluble in base, to separate as an oil. The oil was taken up in ether, the ether solution was separated and dried, and the ether was removed by evaporation in vacuo. The residue, comprising N-methyl propargylaniline, was purified by distillation. The compound boiled at 65–66° C./5 mm. Hg.

*Analysis.*—Calc.: N, 9.65. Found: N, 9.54.

*Example 7.—3-t-butylamino-3-methyl-1-butyne*

A mixture containing 1050 g. of t-butylamine, 290 ml. of water, and 0.3 g. of copper-bronze powder was prepared under nitrogen in a 3-neck flask equipped with a mechanical stirrer and dropping funnel. 294.8 g. of 3-chloro-3-methyl-1-butyne in 50 ml. of ether were added dropwise with stirring while the reaction temperature was maintained in the range 17–20° C. by means of external cooling. After the addition had been completed, the reaction mixture was stirred for an additional 2 hours at ambient room temperature and was then poured into a solvent mixture containing 1000 ml. of ether and 500 ml. of 10 percent aqueous sodium hydroxide. The ethereal layer was separated and was contacted with 4000 ml. of aqueous hydrochloric acid, 3-t-butylamino-3-methyl-1-butyne passing into the acidic layer as the hydrochloride salt. The ethereal layer was discarded. The acidic layer was made basic with 40 percent sodium hydroxide, thus forming t-butylamino-3-methyl-1-butyne free base which was insoluble in the alkaline layer and was extracted with 1000 ml. of ether. The ethereal layer was separated and was dried. The ether was removed by evaporation in vacuo, and the residue comprising 3-t-butylamino-3-methyl-1-butyne formed in the above reaction was purified by distillation. 224 g. (56 percent yield) of 3-t-butylamino-3-methyl-1-butyne boiling at about 83° C./35 mm. Hg were obtained.

*Example 8.—3-anilino-3-methyl-1-butyne*

A mixture was prepared containing 27.9 g. of aniline, 40.5 g. of triethylamine, 100 ml. of ether, 25 ml. of water, 0.3 g. of cuprous chloride, and 0.3 g. of copper-bronze powder in a 3-neck flask equipped with a mechanical stirrer and a dropping funnel. 25.5 g. of 3-chloro-3-methyl-1-butyne dissolved in 25 ml. of ether were added dropwise with stirring in an atmosphere of nitrogen while maintaining the reaction temperature in the range 16–20° C. by means of external cooling. After the addition had been completed, the reaction mixture was stirred for an additional 2 hours at room temperature. 3-anilino-3-methyl-1-butyne was isolated and purified by the procedure set forth in Example 1. 23.5 g. (59 percent yield) of 3-anilino-3-methyl-1-butyne boiling in the range 76–78° C./0.2 mm. Hg.

Table I which follows lists other acetylenic amines prepared by the process of this invention:

TABLE I

| Name of Compound | B.P. °C. | B.P. Mm. | $n_D^{25}$ | Percent Yield |
|---|---|---|---|---|
| 3-methylamino-3-methyl-1-butyne | 96– 98 | Atom. | 1.423 | 59 |
| 3-ethylamino-3-methyl-1-butyne | 108–109 | Atom. | | 44 |
| 3-n-butylamino-3-methyl-1-butyne | 151 | Atom. | 1.428 | 19 |
| 3-morpholino-3-methyl-1-butyne | 97 | 30 | | 79 |
| 3-piperidino-3-methyl-1-butyne | 74 | 18 | | 68 |
| N-methyl-N-phenyl-3-amino-3-methyl-1-butyne | 72 | .5 | 1.521 | 44 |
| 3-p-anisidino-3-methyl-1-butyne | 110–111 | .3 | 1.539 | 55 |
| 3-ethylamino-3-methyl-1-pentyne | 75– 76 | 110 | 1.432 | 57 |
| 3-isopropylamino-3-methyl-1-pentyne | 79 | 90 | 1.427 | 23 |
| 3-diethylamino-3-methyl-1-pentyne | 162–164 | Atom. | 1.440 | 21 |
| 3-anilino-3-methyl-1-pentyne | 96 | 1 | | 58 |
| 3-ethylamino-3-ethyl-1-pentyne | 83 | 70 | 1.438 | 49 |
| 3-anilino-3-ethyl-1-pentyne | 101 | 1 | 1.537 | 46 |
| 1-ethylamino-1-ethynylcyclohexane | 79 | 15 | 1.469 | 28 |
| 1-anilino-1-ethynylcyclohexane | | | | 60 |
| 3-o-chloroanilino-3-methyl-1-butyne | 68– 69 | .01 | 1.556 | 55 |
| 3-p-toluidino-3-methyl-1-butyne | 50– 51 | .08 | | |
| 3-m-nitroanilino-3-methyl-1-butyne | 130 | 95 | | |

Further illustrative acetylenic compounds which can be prepared by the procedures of the above examples include the following:

3-(2,4-dichloranilino)-3,4-dimethyl-1-pentyne
3-(o-bromanilino)-3,4,4-trimethyl-1-pentyne
3-(p-anisidino)-3-methyl-1-decyne
N-ethyl-N-(3,4-dimethoxyphenyl)3-amino-3-methyl-1-butyne
3-m-ethoxyanilino-3-methyl-1-pentadecyne
3-p-toluidino-3-methyl-1-pentyne
3-p-acetylamino-anilino-3,5-dimethyl-1-hexyne
3-p-trifluoromethylanilino-3,4-dimethyl-1-hexyne
1-p-ethylamino-anilino-1-ethynylcyclobutane
1-p-butenylamino-anilino-1-ethynyl-3-cyclopentene
1-p-(4-chlorobenzylamino)anilino-1-ethynylcyclohexane
1-(4-pyrrolidino-anilino)-1-ethynylcycloheptane
3-p-hydroxyanilino-3-ethyl-1-hexyne
N-methyl 3-(3,4-dimethylanilino)-3-methyl-1-butyne
3-methyl-3-benzylamino-1-butyne
3-methyl-3-ethylamino-1-butyne
3-methyl-3-n-butylamino-1-butyne
3-ethyl-3-ethylamino-1-butyne
3-methyl-3-t-butylamino-1-butyne
3-allylamino-3-methyl-1-butyne
3-methyl-3-cyclohexylamino-1-butyne
3-amino-3-methyl-1-butyne
3-ethylamino-3-methyl-1-butyne
3-(2-mercapto-ethylamino)-3-cyclohexyl-1-octyne
3-(2-carboxy-2-hydroxyethylamino)-3-(3-cyclopentenyl)-1-hexyne
N-methyl-N-(2-aminocyclohexyl) 3-amino-3-isopropyl-1-heptyne
N-n-butyl-N-(3-ethoxypropyl) 3-amino-3-methyl-1-hexyne
3-(2-phenyl-2-hydroxyethylamino)-3-methyl-1-pentyne
and the like.

The syntheses of representative dihydroquinolines by the procedure of this invention are illustrated in the following examples:

*Example 9.—2,2,6-trimethyl-1,2-dihydroquinoline*

The following ingredients were placed in a one-liter, three-neck flask equipped with stirrer and thermometer: 54 g. p-toluidine, 61 g. triethylamine, 150 ml. ether, 40 ml. water, 1 g. copper-bronze powder, and 1 g. cuprous chloride. The contents of the flask were cooled to about 0° C. and 51 g. of 3-chloro-3-methyl-1-butyne were added slowly with stirring, the temperature remaining below about 10° C. After the addition had been completed, the reaction mixture was allowed to warm to ambient room temperature. The solvents were removed by evaporation in vacuo. One liter of ether was added to the residue and the ethereal solution was extracted with 12 N hydrochloric acid in 100-ml. portions until all the basic material had been extracted. The acidic extracts were combined and cooled. The acidic layer was made basic by the addition of 45 percent aqueous sodium hydroxide, thus producing an alkali-insoluble, tarry residue. The residue was dissolved in ether. The ethereal solution was dried and the dried solution distilled through a spinning band column. The first fraction obtained, with a boiling point in the range 47–51° C./0.08 mm. Hg, consisted of 1,1-dimethyl-N-p-tolylpropargylamine, and the second fraction, boiling in the range 60–63° C. at the same pressure, consisted of 2,2,6-trimethyl-1,2-dihydroquinoline. The comparative yields were 22 g. of the propargylamine and 2 g. of the dihydroquinoline.

2,2,6-trimethyl-1,2-dihydroquinoline thus prepared was converted to the corresponding tetrahydroquinoline by hydrogenation employing ethanol as a solvent, 5 percent palladium-on-carbon as a catalyst, and a hydrogen pressure of 50 p.s.i. After the hydrogenation was complete, the catalyst was separated by filtration, and 2,2,6-trimethyl-1,2,3,4-tetrahydroquinoline, present in the filtrate, was converted to the corresponding hydrochloride salt by passing anhydrous gaseous hydrogen chloride into the filtrate. The hydrochloride salt melted at about 75° C. after recrystallization from a mixture of ether and alcohol.

*Analysis.*—Calc.: C, 68.07; H, 8.57; N, 6.62. Found: C, 67.91; H, 8.80; N, 6.35.

*Example 10.—Alternate preparation of 2,2,6-trimethyl-1,2-dihydroquinoline*

A reaction mixture was prepared by placing 300 g. of p-toluidine, 300 g. of ethanol, 18 g. of water, 1 g. of copper-bronze powder, and 1 g. of cuprous chloride in a one-liter, three-neck flask equipped with stirrer and thermometer. 102 g. of 3-chloro-3-methyl-1-butyne were added thereto in dropwise fashion with stirring while maintaining the temperature below about 30° C. After the addition had been completed, the reaction mixture was stirred at ambient room temperature for about 15 hours and was then filtered. Ethanol was removed from the filtrate by evaporation in vacuo and 200 g. each of water and ether were added to the resulting concentrate. Sufficient sodium bicarbonate was added to make the aqueous layer basic. The ethereal layer was separated and dried, and the ether was removed by evaporation in vacuo. Distillation of the residue yielded 2,2,6-trimethyl-1,2-dihydroquinoline boiling at about 64° C./2 mm. Hg.

*Analysis.*—Calc.: C, 83.19; H, 8.73; N, 8.09. Found: C, 83.17; H, 8.77; N, 8.25; $n_D^{25}$=1.576.

The corresponding hydrochloride salt was prepared by the method of Example 2 and melted at about 129–130° C.

*Analysis.*—Calc.: C, 68.72; H, 7.67; N, 6.68. Found: C, 68.64; H, 7.95; N, 6.60.

Following the above procedure, m-chloroaniline and 3-chloro-3-methyl-1-butyne were reacted to form 2,2-dimethyl-7-chloro-1,2-dihydroquinoline which boiled at about 80° C./0.2 mm. Hg; $n_D^{25}=1.601$.

The corresponding hydrochloride salt was prepared by the method of Example 2 and melted at about 144–146° C.

*Analysis.*—Calc.: C, 57.40; H, 5.69; N, 6.09. Found: C, 57.66; H, 5.83; N, 6.05.

*Example 11.—2,2-dimethyl-7-nitro-1,2-dihydroquinoline*

A reaction mixture was prepared containing 20 g. of 3-m-nitro-anilino-3-methyl-1-butyne, 20 g. of aniline hydrochloride, 100 ml. of water, 100 ml. of ether, 1 g. of cuprous chloride, and 1 g. of copper-bronze powder. The reaction mixture was stirred vigorously for about three days and was then made basic by the addition of 45 percent aqueous sodium hydroxide. The ether layer was separated and dried, and the ether was removed by evaporation in vacuo. Distillation of the residue yielded 2,2-dimethyl-7-nitro-1,2-dihydroquinoline boiling at about 130° C./0.5 mm. Hg. A small sample of the distillate was converted to the corresponding hydrochloride salt by the method of Example 2. The compound melted at about 155–156° C.

*Analysis.*—Calc.: C, 54.89; H, 5.44; N, 11.64. Found: C, 54.59; H, 5.53; N, 11.46.

Following the above procedure, 3-p-ethoxyanilino-3-methyl-1-butyne was converted to 2,2-dimethyl-6-ethoxy-1,2-dihydroquinoline. The corresponding hydrochloride salt was prepared by the method of Example 2 and melted at about 137–138° C. after recrystallization from ethyl acetate.

*Analysis.*—Calc.: C, 65.12; H, 7.57; N, 5.84. Found: C, 64.89; H, 7.72; N, 5.67.

*Example 12.—2,2-dimethyl-1,2-dihydroquinoline*

A reaction mixture was prepared containing 5 g. of 3-anilino-3-methyl-1-butyne, 5 g. of aniline hydrochloride, 1.5 g. of cuprous chloride, and 1.5 g. of copper-bronze powder. One hundred grams of water were added and the reaction mixture was stirred vigorously for about 18 hours. The reaction mixture was made basic and any amines present were extracted with ether. The ether extract was separated, dried, and distilled; 2,2-dimethyl-1,2-dihydroquinoline thus synthesized distilled in the range 75–78° C./0.08 mm. Hg; $n_D^{25}=1.590$.

*Analysis.*—Calc.: C, 82.97; H, 8.23; N, 8.80. Found: C, 82.88; H, 8.48; N, 8.95. The corresponding hydrochloride salt was prepared by the method of Example 2 and melted at about 200–201° C.

Following the above procedure, propargylaniline was cyclized to yield dihydroquinoline which oxidized in air during the purification procedure so that quinoline was the ultimate reaction product.

*Example 13.—Preparation of quinaldine*

A reaction mixture containing 12 g. of 3-anilino-1-butyne, 100 ml. of water, 100 ml. methanol, and 500 mg. each of copper-bronze powder and cuprous chloride was refluxed for about 48 hours, thus forming dihydroquinaldine which partially oxidized in air to quinaldine during the period of refluxing. Twenty-five grams of cupric sulfate pentahydrate were added to oxidize any remaining dihydroquinaldine to quinaldine, and the refluxing was continued for an additional 15 hours. The reaction mixture was extracted with ether, and the ether extract was separated and dried. The ether was removed by evaporation in vacuo. Distillation of the residue yielded quinaldine boiling at about 110° C./5 mm. Hg.

Following the above procedure, 4-anilino-2-butyne was cyclized to yield dihydrolepidine, which was oxidized to lepidine by air during the course of the reaction.

The above procedure was used to prepare 2,2-dimethyl-1,2-dihydro-1,6-naphthyridine from N-(4-pyridyl) 3-amino-3-methyl-1-butyne except that no oxidizing agent was added, since 2,2-dimethyl-1,2-dihydro-1,6-naphthyridine cannot be oxidized to give a fully aromatized compound. The compound was a solid and melted at about 84–86° C.

*Analysis.*—Calc.: C, 74.96; H, 7.55; N, 17.49. Found: C, 75.05; H, 7.45; N, 17.32.

The α-halo-acetylenes which constitute one of the starting materials for the processes of this invention are readily prepared from the corresponding α-hydroxyacetylenes. The latter compounds are, in turn, prepared by the reaction of sodium acetylide with an aldehyde or ketone. Both of the above procedures are extensively documented in the prior art.

We claim:

1. The method of preparing a dihydroquinoline which comprises commingling a compound represented by the following formula:

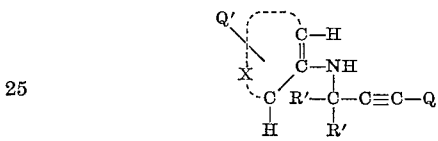

wherein

R' is a member of the group consisting of hydrogen, $C_1$–$C_{12}$ alkyl, $C_2$–$C_{12}$ alkenyl, cycloalkyl, cycloalkenyl, and lower alkoxy-substituted $C_1$–$C_5$ alkyl;

R' and R', when taken together to the carbon atom to which they are attached, represent a member of the group consisting of cycloalkyl and cycloalkenyl;

Q is a member of the group consisting of hydrogen, $C_1$–$C_5$ alkyl, lower alkoxy-substituted $C_1$–$C_5$ alkyl, and monocyclic aryl-substituted $C_1$–$C_5$ alkyl;

Q' represents a member of the group consisting of halogen, $C_1$–$C_5$ alkyl, $C_2$–$C_5$ alkenyl, nitro, perhalo-lower alkyl, lower alkoxy, and di-lower alkylamino; and, X represents a grouping of atoms necessary to complete an aromatic ring;

with a copper or a copper salt catalyst to yield a dihydroquinoline represented by the following formula:

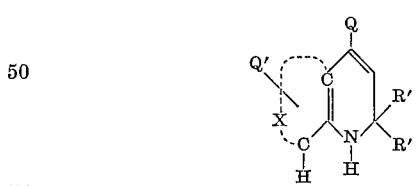

wherein R', Q, Q' and X have the same meaning as hereinabove.

2. The method of preparing a dihydroquinoline which comprises reacting a compound represented by the following formula:

wherein

R' is a member of the group consisting of hydrogen, $C_1$–$C_{12}$ alkyl, $C_2$–$C_{12}$ alkenyl, cycloalkyl, cycloalkenyl, and lower alkoxy-substituted $C_1$–$C_5$ alkyl;

the two R' groups, when taken together with the carbon atom to which they are attached, represent a member of the group consisting of cycloalkyl and cycloalkenyl; and, Hal is a halogen atom;

with an aryl amine represented by the following formula:

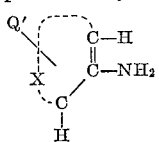

wherein
Q' represents a member of the group consisting of halogen, $C_1$–$C_5$ alkyl, $C_2$–$C_5$ alkenyl, nitro, perhalo-lower alkyl, lower alkoxy, and di-lower alkylamino; and,
X represents a grouping of atoms necessary to complete an aromatic ring;
in the presence of copper or a copper salt catalyst for sufficient time to yield a substantial quantity of a dihydroquinoline of the following formula:

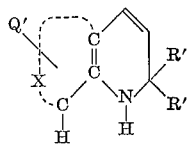

wherein R', Q' and X have the same meaning as hereinabove and isolating said dihydroquinoline from the reaction mixture.

References Cited
UNITED STATES PATENTS

| | | | |
|---|---|---|---|
| 1,788,773 | 1/1931 | Matheson | 260—280 |
| 2,268,129 | 12/1941 | Reppe et al. | 260—283 |

FOREIGN PATENTS 1,207,930   12/1965   Germany.

OTHER REFERENCES

Hennion et al.: Am. Chem. Soc., vol. 80, pp. 4908–12 (1960).

ALEX MAZEL, *Primary Examiner.*

DONALD G. DAUS, *Assistant Examiner.*